United States Patent
Patel

(12) 
(10) Patent No.: US 6,301,139 B1
(45) Date of Patent: Oct. 9, 2001

(54) SELF-DRIVEN SYNCHRONOUS RECTIFIER CIRCUIT FOR NON-OPTIMAL RESET SECONDARY VOLTAGE

(75) Inventor: Amrit P. Patel, Camarillo, CA (US)

(73) Assignee: Power-One, Inc., Camarillo, CA (US)

( * ) Notice: Subject to any disclaimer, the term of this patent is extended or adjusted under 35 U.S.C. 154(b) by 0 days.

(21) Appl. No.: 09/765,799

(22) Filed: Jan. 19, 2001

Related U.S. Application Data

(60) Provisional application No. 60/195,019, filed on Apr. 6, 2000.

(51) Int. Cl.[7] .......................... H02M 7/217; H02M 3/335
(52) U.S. Cl. .................. 363/127; 363/21.06; 363/21.14; 363/88; 363/91
(58) Field of Search .................................. 363/84, 88, 89, 363/90, 91, 93, 125, 127, 21.06, 21.14

(56) References Cited

U.S. PATENT DOCUMENTS

| | | | |
|---|---|---|---|
| Re. 36,098 | 2/1999 | Vinciarelli | 363/20 |
| 4,716,514 | 12/1987 | Patel | 363/127 |
| 4,766,479 | 8/1988 | Krum et al. | 357/74 |
| 4,903,189 | 2/1990 | Ngo et al. | 363/127 |
| 4,922,404 | 5/1990 | Ludwig et al. | 363/89 |
| 5,097,403 | 3/1992 | Smith | 363/127 |

(List continued on next page.)

Primary Examiner—Jessica Han

(74) Attorney, Agent, or Firm—O'Melveny & Myers LLP

(57) ABSTRACT

A power converter has a self-driven synchronous rectification circuit that can operate efficiently with a non-optimal reset secondary voltage waveform that remains at a zero voltage level during a portion of the switching cycle. The power converter circuit includes a transformer having a primary winding and a secondary winding, in which primary winding is supplied with a non-optimal reset waveform that remains at a zero voltage level for a portion of a power cycle thereof. A first synchronous rectifier is connected in series with the first end of the secondary winding and is controlled by a voltage at the second end of the secondary winding. A second synchronous rectifier is connected in series with the second end of the secondary winding, and is further connected to an output terminal of the power converter circuit through a storage choke. A saturable reactor is connected in series between the first synchronous rectifier and the first end of the secondary winding. A switching device is connected to the first end of the secondary winding and is controlled by the voltage at the second end of the secondary winding. The switching device further controls the second synchronous rectifier. A capacitor is connected to the second synchronous rectifier, and is charged by operation of the switching device to maintain the second synchronous rectifier in a conductive state during the zero voltage level portion of the non-optimal reset waveform. Upon transition to a positive voltage level portion of the waveform following the zero voltage level portion, the capacitor discharges through the switching device. The saturable reactor precludes current from flowing through the first synchronous rectifier for a period of time sufficient to allow the capacitor to discharge.

19 Claims, 3 Drawing Sheets

U.S. PATENT DOCUMENTS

| | | | |
|---|---|---|---|
| 5,126,651 | 6/1992 | Gauen | 323/222 |
| 5,173,847 | 12/1992 | Suzuki | 363/21 |
| 5,179,512 | 1/1993 | Fisher et al. | 363/127 |
| 5,237,606 | 8/1993 | Ziermann | 363/21 X |
| 5,274,543 | 12/1993 | Loftus, Jr. | 363/127 |
| 5,303,138 | 4/1994 | Rozman | 363/21 |
| 5,457,624 | 10/1995 | Hastings | 363/127 |
| 5,523,940 | 6/1996 | Wymelenberg | 363/127 |
| 5,528,482 | 6/1996 | Rozman | 363/21 |
| 5,544,038 | 8/1996 | Fisher et al. | 363/147 |
| 5,552,695 | 9/1996 | Schwartz | 323/271 |
| 5,590,032 | 12/1996 | Bowman et al. | 363/15 |
| 5,625,541 | 4/1997 | Rozman | 363/21 |
| 5,636,116 | 6/1997 | Milavec et al. | 363/89 |
| 5,663,877 | 9/1997 | Dittli et al. | 363/127 |
| 5,708,571 | 1/1998 | Shinada | 363/16 |
| 5,726,869 | 3/1998 | Yamashita et al. | 363/21 |
| 5,734,563 | 3/1998 | Shinada | 363/21 |
| 5,818,704 | 10/1998 | Martinez | 363/21 |
| 5,847,554 | 12/1998 | Wilcox et al. | 323/282 |
| 5,872,705 | 2/1999 | Luftus, Jr. et al. | 363/21 |
| 5,912,552 | 6/1999 | Tateishi | 323/285 |
| 5,920,475 | 7/1999 | Boylan et al. | 363/127 |
| 5,929,615 | 7/1999 | D'Angelo et al. | 323/224 |
| 5,929,690 | 7/1999 | Williams | 327/374 |
| 5,940,287 | 8/1999 | Brkovic | 363/127 |
| 5,946,207 | 8/1999 | Schoofs | 363/127 |
| 5,956,245 | 9/1999 | Rozman | 363/89 |

SELF-DRIVEN SYNCHRONOUS RECTIFIER CIRCUIT FOR NON-OPTIMAL RESET SECONDARY VOLTAGE

RELATED APPLICATION DATA

This patent application claims priority pursuant to 35 U.S.C. § 119(e) to provisional patent application Ser. No. 60/195,019, filed Apr. 6, 2000, the subject matter of which is incorporated by reference herein in its entirety.

BACKGROUND OF THE INVENTION

1. Field of the Invention

The present invention relates to DC-to-DC power converter circuits, and more particularly, to a power converter having a self-driven synchronous rectifier circuit for a non-optimal reset secondary voltage that remains at a zero voltage level during a portion of a switching cycle.

2. Description of Related Art

Self-driven synchronous rectification circuits are known in the art for providing rectification of a voltage that alternates between positive and negative values in a DC-to-DC power converter circuit. An example of a conventional self-driven synchronous rectification circuit is provided in FIG. 1.

More specifically, the self-driven synchronous rectification circuit of FIG. 1 is provided on the secondary side of a transformer 20 having a primary winding 22 and a secondary winding 24. The self-driven synchronous recification circuit includes first and second rectifiers 12, 14 that are each provided by MOSFET devices, e.g., n-channel enhancement-type MOSFETs. The first rectifier 12 has a drain terminal connected to a first end A of the transformer secondary winding 24 and the second rectifier 14 has a drain terminal connected to a second end B of the transformer secondary winding. The gate terminal of the first rectifier 12 is connected to the second end B of the transformer secondary winding through a current limiting resistor 16 and to ground through resistor 17. The gate terminal of the second rectifier 14 is connected to the first end A of the transformer secondary winding through a current limiting resistor 18 and to ground through resistor 19. The source terminals of the first and second rectifiers 12, 14 are coupled to ground. The synchronous rectification circuit provides an output voltage ($V_{OUT}$) between a positive terminal and ground. The positive terminal is coupled to the second end B of the transformer through output storage choke 26. A capacitor 28 is coupled between the positive terminal and ground to filter high frequency components of the rectified output voltage ($V_{OUT}$).

The operation of the self-driven synchronous rectification circuit of FIG. 1 is illustrated with respect to the timing diagram of FIG. 2a, which depicts the voltage between the B and A ends of the secondary winding of the transformer ($V_{B-A}$). In FIG. 2a, the voltage $V_{B-A}$ is illustrated as a series of rectangular pulses having a predetermined duty cycle that alternates between a positive voltage and a negative voltage. When the voltage $V_{B-A}$ is positive, i.e., the voltage at end B is positive with respect to the voltage at end A, the first rectifier 12 is turned on and the second rectifier 14 is turned off. This causes a current path to form through the first rectifier 12, the transformer secondary winding 24, and the storage choke 26 to deliver power to the output terminals. Conversely, when the voltage $V_{B-A}$ is negative, i.e., the voltage at end B is negative with respect to the voltage at end A, the first rectifier 12 is turned off and the second rectifier 14 is turned on. This causes a path for magnetization current stored in the choke 26 during the previous part of the cycle through the second rectifier 14 and the storage choke 26 to the output terminals.

Power is delivered to the secondary side of the transformer only during the positive part of the cycle. The negative part of the cycle is used to reset the transformer. The first rectifier 12 is generally known as the "forward" synchronous rectifier since it is used to conduct current to the output terminals from the transformer 20 during the positive part of the power cycle. The second rectifier 14 is generally known as the "free-wheeling" synchronous rectifier since it is used to conduct current to the output terminals during the negative part of the cycle while the transformer 20 is resetting. When operated with the secondary voltage depicted in FIG. 2a, the gate drives of the rectifiers 12, 14 are synchronized with current flow through the body diodes of the MOSFET devices. In other words, very little current flows through the body diodes of the MOSFET devices when the secondary voltage has an "optimum reset" waveform in the form of FIG. 2a.

A significant drawback of the self-driven synchronous rectification circuit of FIG. 1 is that its efficiency is substantially degraded when MOSFET devices are driven by a "non-optimal reset" secondary voltage across the transformer 20. FIG. 2b depicts a "non-optimal reset" secondary voltage waveform in which the voltage $V_{B-A}$ remains at the zero level during a portion of one switching cycle. Specifically, the zero voltage state occurs after the negative voltage state (reset) and before the next positive voltage state. When the secondary voltage $V_{B-A}$ is zero, both the first rectifier 12 and the second rectifier 14 are turned off. Magnetization current of the storage choke 26 is conducted through the body diode of the second rectifier 14 during the zero voltage portion of the switching cycle. It is undesirable for the body diodes of the MOSFET devices 12, 14 to conduct current during a substantial portion of the switching cycle since they cause a voltage drop that results in substantial power loss, i.e., reduced efficiency.

Accordingly, it would be desirable to provide a power converter having a self-driven synchronous rectification circuit that overcomes these and other disadvantages of the prior art.

SUMMARY OF THE INVENTION

The invention is directed to a power converter having a self-driven synchronous rectification circuit that can operate efficiently with a non-optimal reset secondary voltage waveform that remains at a zero voltage level during a portion of the switching cycle.

More particularly, the power converter circuit comprises a transformer having a primary winding and a secondary winding, in which primary winding is supplied with a non-optimal reset waveform that remains at a zero voltage level for a portion of a power cycle thereof. A first synchronous rectifier is connected in series with the first end of the secondary winding and is controlled by a voltage at the second end of the secondary winding. A second synchronous rectifier is connected in series with the second end of the secondary winding, and is further connected to an output terminal of the power converter circuit through a storage choke. A saturable reactor is connected in series between the first synchronous rectifier and the first end of the secondary winding. A switching device is connected to the first end of the secondary winding and is controlled by the voltage at the second end of the secondary winding. The switching device further controls the second synchronous rectifier. A capacitor is connected to the second synchronous rectifier, and is charged by operation of the switching device to maintain the second synchronous rectifier in a conductive state during the zero voltage level portion of the non-optimal reset waveform. Upon transition to a positive voltage level portion of the waveform following the zero voltage level portion, the capacitor discharges through the switching device. The saturable reactor precludes current from flowing through the first synchronous rectifier for a period of time sufficient to allow the capacitor to discharge.

In an embodiment of the invention, the first synchronous rectifier further comprises a first MOSFET having a drain terminal connected to the first end of the secondary winding through the saturable reactor, a gate terminal connected to the second end of the secondary winding, and a source terminal connected to ground. The second synchronous rectifier further comprises a second MOSFET having a drain terminal connected to the second end of the secondary winding, a gate terminal, and a source terminal connected to ground. The drain terminal of the second MOSFET is further connected to the output terminal of the power converter circuit through the storage choke. The switching device further comprises a third MOSFET having a drain terminal connected to the gate terminal of the second MOSFET, a source terminal connected to the first end of the secondary winding, and a gate terminal connected to the second end of the secondary winding. The capacitor is connected between the gate terminal of the second MOSFET and ground. The capacitor is charged by current flowing through a body diode of the third MOSFET in order to maintain the second MOSFET in the conductive state during the zero voltage level portion of the waveform.

In a second embodiment of the invention, the secondary winding further comprises a first secondary winding and a second secondary winding each having respective first and second ends, and wherein the primary winding and secondary windings have opposite polarity. The first synchronous rectifier further comprises a first MOSFET having a drain terminal connected to the first end of the first secondary winding, a gate terminal connected to the first end of the second secondary winding, and a source terminal connected to ground. The switching device further comprises a third MOSFET having a drain terminal connected to the gate terminal of the second MOSFET, a source terminal connected to the second end of the second secondary winding, and a gate terminal connected to the first end of the second secondary winding. A flip-flop circuit is coupled to the first and second ends of the second secondary winding. The flip-flop circuit alternatively couples one of the first and second ends of the second secondary winding to ground.

In a third embodiment of the invention, the secondary winding further comprises a first secondary winding and a second secondary winding each having respective first and second ends, and wherein the primary winding and secondary windings have opposite polarity. The second secondary winding further comprises a center tap connected to ground. The first synchronous rectifier further comprises a first MOSFET having a drain terminal connected to the first end of the first secondary winding, a gate terminal connected to the first end of the second secondary winding, and a source terminal connected to ground. The switching device further comprises a third MOSFET having a drain terminal connected to the gate terminal of the second MOSFET, a source terminal connected to the second end of the second secondary winding, and a gate terminal connected to ground.

A more complete understanding of the self-driven synchronous rectifier circuit for non-optimal reset seconday voltage power converters will be afforded to those skilled in the art, as well as a realization of additional advantages and objects thereof, by a consideration of the following detailed description of the preferred embodiment. Reference will be made to the appended sheets of drawings, which will be first described briefly.

DETAILED DESCRIPTION OF THE PREFERRED EMBODIMENT

The present invention satisfies the need for a self-driven synchronous rectification circuit that can operate efficiently with a non-optimal reset secondary voltage waveform that remains at a zero voltage level during a portion of the switching cycle. In the detailed description that follows, like element numerals are used to describe like elements illustrated in one or more of the figures.

Figure 1:
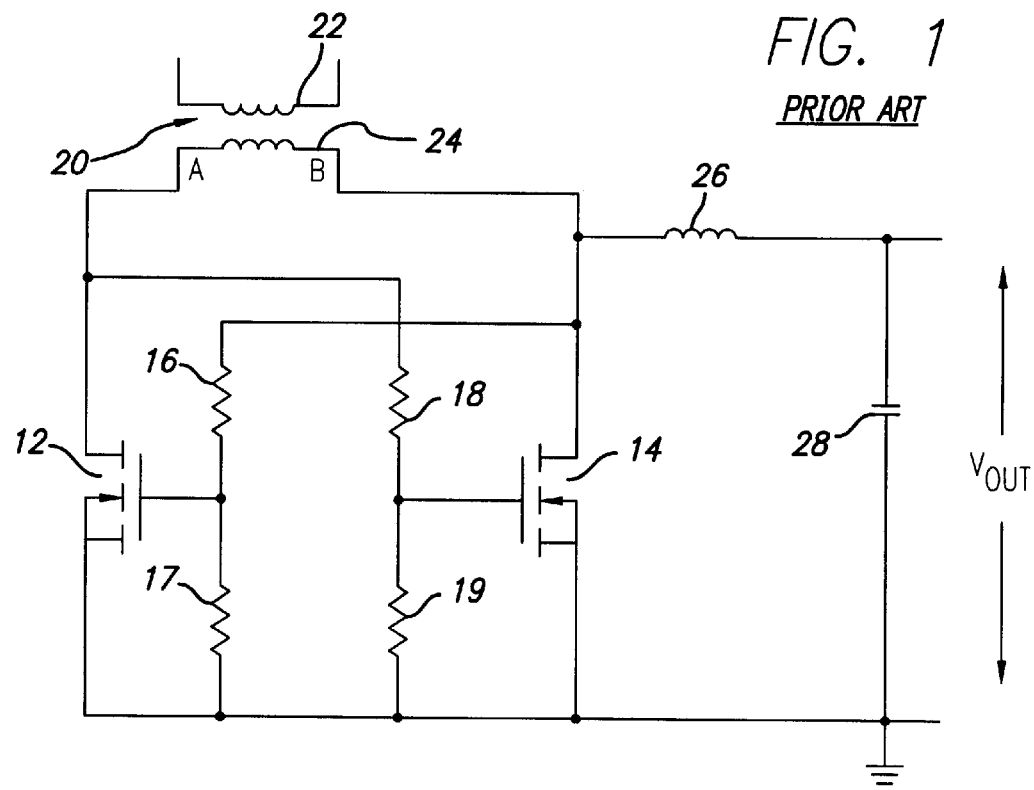
FIG. 1 is a schematic drawing of a prior art self-driven synchronous rectification circuit.
Figure 2A:
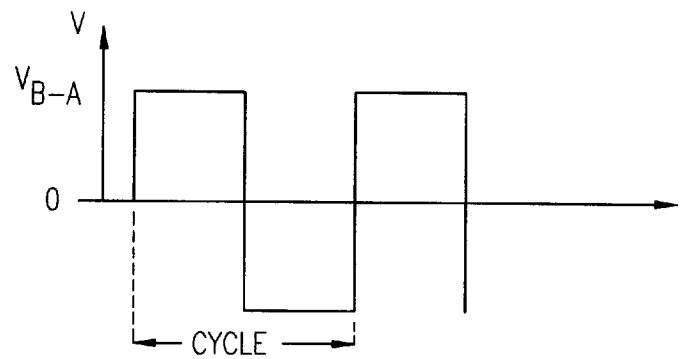
FIGS. 2a–2b illustrate secondary voltage waveforms for an optimum reset forward converter and a non-optimal reset forward converter, respectively.
Figure 2B:
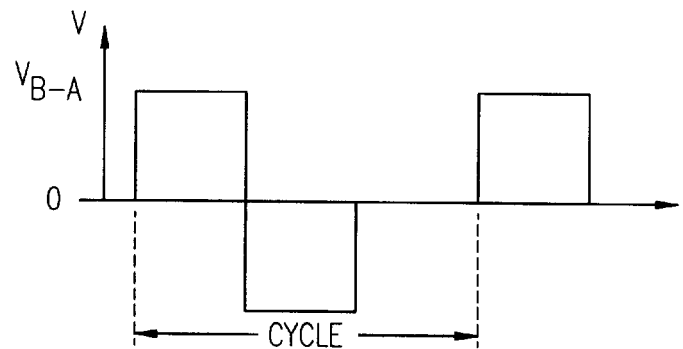
Figure 3:
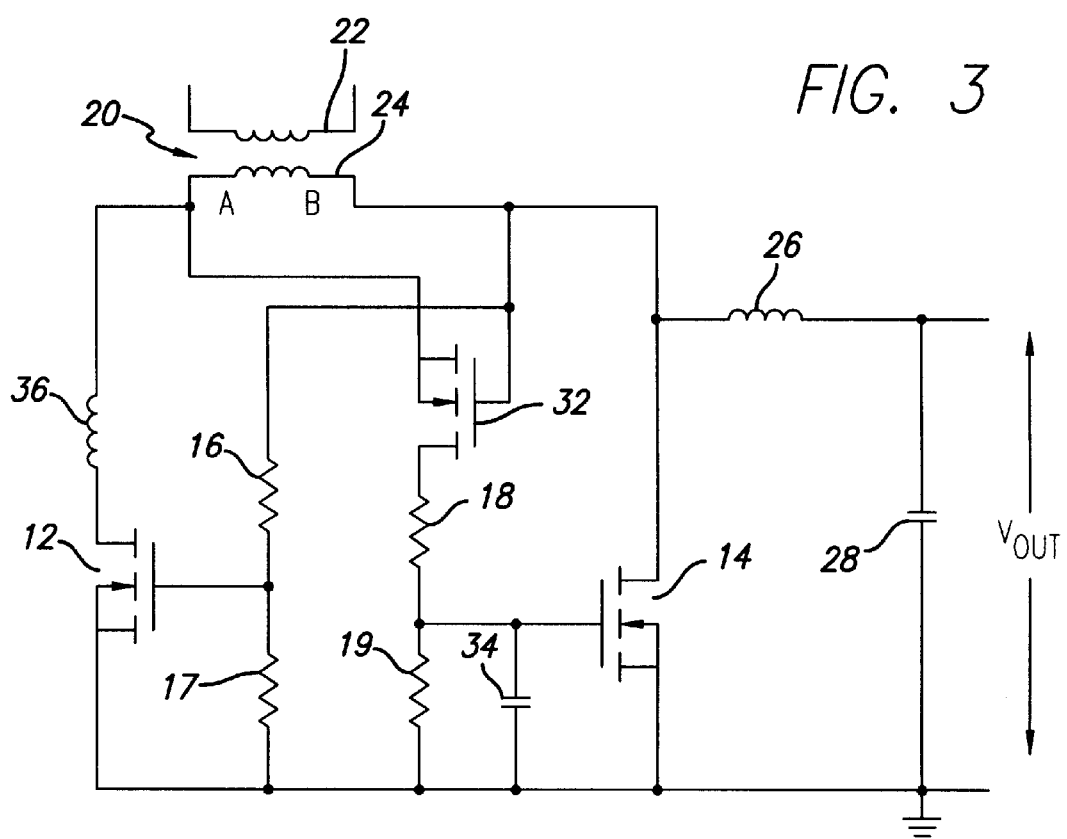
FIG. 3 is a schematic drawing of a self-driven synchronous rectification circuit in accordance with a first embodiment of the present invention.

Referring now to FIG. 3, an embodiment of a self-driven synchronous rectification circuit constructed in accordance with the present invention is illustrated. The embodiment is intended for use with a non-optimal reset secondary voltage as shown in FIG. 2b. The synchronous rectification circuit differs from the prior art circuit in that the gate terminal of the second rectifier 14 is driven by a third MOSFET device 32. The MOSFET device 32 has a gate terminal connected to the B side of the transformer secondary winding 24, a source terminal connected to the A side of the transformer secondary winding, and a drain terminal connected to the gate terminal of the second rectifier 14 through current limiting resistor 18. A capacitor 34 is connected between the gate terminal of the second rectifier 14 and ground. A saturable reactor 36 is connected in series between the A side of the transformer secondary winding 24 and the drain terminal of the first rectifier 12. The saturable reactor 36 may comprise a ferrite bead that initially presents a high impedance, and then quickly becomes saturated by current flowing therethrough causing the impedance to drop. In other words, the saturable reactor 36 acts as a magnetic switch by exhibiting high-impedance characteristics during a blocking period (switch is off) and low-impedance characteristics when in saturation (switch is off).

The operation of the self-driven synchronous rectification circuit of FIG. 3 is now described with respect to the forward converter switching cycle illustrated in FIG. 2b. Before the voltage $V_{B-A}$ turns positive, i.e., the voltage at transformer end B turning positive with respect to the voltage at end A, the second rectifier 14 is turned on and the first rectifier 12 is turned off. When the voltage $V_{B-A}$ switches from zero to positive, the third MOSFET device 32 turns on and thereby allows the capacitor 34 to discharge. The saturable reactor 36 offers high impedance for a very brief period of time, such as a few hundred nanoseconds, in order to allow time for the capacitor 34 to discharge. As soon as the saturable reactor 36 saturates, current begins flowing through the first rectifier 12. If the saturable reactor 36 were not present, then both the first rectifier 12 and the second rectifier 14 would be conducting at the same time. This would cause a short across the transformer secondary winding 24 that could potentially damage the synchronous rectification circuit. The saturable reactor 36 protects the synchronous rectification circuit against this possibility. Once the saturable reactor 36 saturates, the current starts flowing through the first rectifier 12, the transformer secondary winding 24, and the storage choke 26 to deliver power to the output terminal of the synchronous rectification circuit. At the same time, the gate terminal of the first rectifier 12 is held at a positive voltage through current limiting resistor 16.

When the voltage $V_{B-A}$ switches from positive to negative, i.e., the voltage at transformer end B is negative with respect to the voltage at end A, the first rectifier 12 is turned off. The load current through the first rectifier 12 drops to zero, and the drain voltage on the first rectifier 12 start to rise. The gate terminal of the second rectifier 14 is charged by current flowing through the body diode of the third MOSFET device 32 and current limiting resistor 18, causing the second rectifier 14 to turn on. The capacitor 34 holds the charge on the gate terminal of the second rectifier 14, thereby keeping the second rectifier 14 turned on. This causes a path for magnetization current stored in the choke 26 during the previous part of the switching cycle through the second rectifier 14 and the storage choke 26 to the output terminal, in the same manner as the prior art circuit. When the negative part of the cycle ends, the voltage $V_{B-A}$ switches from negative to zero. Nevertheless, the second rectifier 14 remains turned on by the charge stored in the capacitor 34. As a result, current stored in the choke 26 during the previous part of the cycle continues to pass through the second rectifier 14, rather than through the body diode of the second rectifier 14. When the voltage $V_{B-A}$ switches back from zero to positive, the cycle repeats again.

Figure 4:
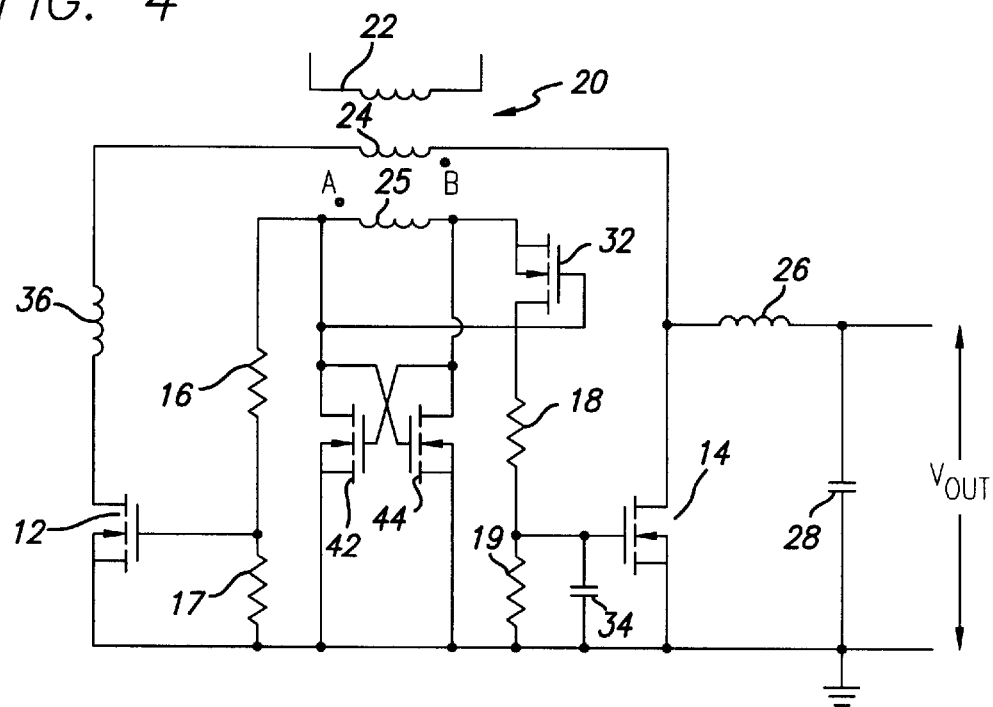
FIG. 4 is a schematic drawing of a self-driven synchronous rectification circuit in accordance with a second embodiment of the present invention.

FIG. 4 illustrates a second embodiment of a self-driven synchronous rectification circuit in accordance with the present invention. The transformer 20 comprises a first secondary winding 24 and a second secondary winding 25 in addition to the primary winding 22. The first and second secondary windings 24, 25 have opposite polarity. The first rectifier 12 has a drain terminal connected to the first end A of the first secondary winding 24 through saturable reactor 36 and the second rectifier 14 has a drain terminal connected to the second end B of the first secondary winding 24. The gate terminal of the first rectifier 12 is connected to the first end A of the second secondary winding 25 through the current limiting resistor 16. The gate terminal of the second rectifier 14 is driven by the third MOSFET device 32 as in the preceding embodiments. The MOSFET device 32 has a gate terminal connected to the first end A of the second secondary winding 25, a source terminal connected to the second end B of the second secondary winding 25, and a drain terminal connected to the gate terminal of the second rectifier 14 through the current limiting resistor 18.

The second embodiment further includes two additional MOSFET devices 42, 44 configured to provide a flip-flop device. Specifically, MOSFET device 42 has a drain terminal connected to the first end A of the second secondary winding 25, a gate terminal connected to the second end B of the second secondary winding 25, and a source terminal connected to ground. Likewise, MOSFET device 44 has a drain terminal connected to the second end B of the second secondary winding 25, a gate terminal connected to the first end A of the second secondary winding 25, and a source terminal connected to ground. The MOSFET devices 42, 44 serve to alternately connect one side of the second secondary winding 25 to ground.

The operation of the second embodiment of the self-driven synchronous rectification circuit of FIG. 4 is similar to the previous embodiment, with the voltage across the second secondary winding 25 controlling the gating of the the first and second rectifiers 12, 14 and the third MOSFET device 32. Before the voltage $V_{B-A}$ turns positive, the second rectifier 14 is turned on and the first rectifier 12 is turned off. When the voltage $V_{B-A}$ switches from zero to positive, the first rectifier 12 and the third MOSFET device 32 turn on due to the positive voltage at the first end A of the second secondary winding 25, which allows the capacitor 34 to discharge. Also, the MOSFET device 44 is turned on which pulls the second end B of the second secondary winding 25 to ground. As soon as the saturable reactor 36 saturates, current begins flowing through the first rectifier 12, the first secondary winding 24, and the storage choke 26 to deliver power to the output terminal of the synchronous rectification circuit. When the voltage $V_{B-A}$ switches from positive to negative, the first rectifier 12 and the MOSFET device 44 are turned off. Also, the MOSFET device 42 is turned on which pulls the first end A of the second secondary winding 25 to ground. As before, the gate terminal of the second rectifier 14 is charged by current flowing through the body diode of the third MOSFET device 32 and current limiting resistor 18, thereby charging the capacitor 34 and turning on the second rectifier 14. This causes a path for magnetization current stored in the choke 26 during the previous part of the switching cycle through the second rectifier 14 and the storage choke 26 to the output terminal, in the same manner as the prior art circuit. When the voltage $V_{B-A}$ switches from negative to zero, the second rectifier 14 remains turned on by the charge stored in the capacitor 34, and current stored in the choke 26 during the previous part of the cycle continues to pass through the second rectifier 14.

Figure 5:
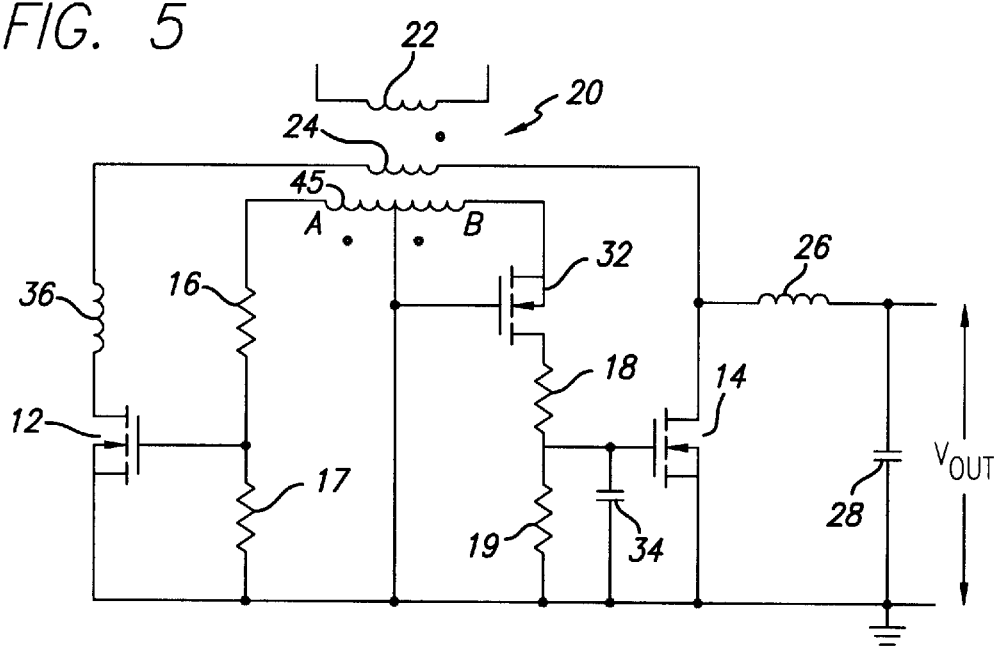
FIG. 5 is a schematic drawing of a self-driven synchronous rectification circuit in accordance with a third embodiment of the present invention.

FIG. 5 illustrates a third embodiment of a self-driven synchronous rectification circuit in accordance with the present invention. In this embodiment, the transformer 20 comprises a first secondary winding 24 and second secondary winding 45. The second secondary winding 45 has a center tap that is connected to ground, effectively defining two separate windings. The first secondary winding 24 and the second secondary winding 45 have opposite polarity. The gate terminal of the first rectifier 12 is connected to the first end A of the second secondary winding 45 through the current limiting resistor 16. The gate terminal of the second rectifier 14 is driven by the third MOSFET device 32 as in the preceding embodiments. The MOSFET device 32 has a gate terminal connected to ground, a source terminal connected to the second end B of the second secondary winding 45, and a drain terminal connected to the gate terminal of the second rectifier 14 through the current limiting resistor 18.

The operation of the third embodiment of the self-driven synchronous rectification circuit of FIG. 5 is similar to the previous embodiment, with the voltage across the second secondary winding 25 controlling the gating of the the first and second rectifiers 12, 14 and the third MOSFET device 32. Before the voltage $V_{B-A}$ turns positive, the second rectifier 14 is turned on and the first rectifier 12 is turned off. When the voltage $V_{B-A}$ switches from zero to positive, the first rectifier 12 and the third MOSFET device 32 turn on due to the positive voltage at the first end A of the second secondary winding 45, which allows the capacitor 34 to discharge. As soon as the saturable reactor 36 saturates, current begins flowing through the first rectifier 12, the first secondary winding 24, and the storage choke 26 to deliver power to the output terminal of the synchronous rectification circuit. When the voltage $V_{B-A}$ switches from positive to negative, the first rectifier 12 and the MOSFET device 32 are turned off. As before, the gate terminal of the second rectifier 14 is charged by current flowing through the body diode of the third MOSFET device 32 and current limiting resistor 18, thereby charging the capacitor 34 and turning on the second rectifier 14. This causes a path for magnetization current stored in the choke 26 during the previous part of the switching cycle through the second rectifier 14 and the storage choke 26 to the output terminal, in the same manner as the prior art circuit. When the voltage $V_{B-A}$ switches from negative to zero, the second rectifier 14 remains turned on by the charge stored in the capacitor 34, and current stored in the choke 26 during the previous part of the cycle continues to pass through the second rectifier 14.

In the foregoing embodiments, the use of the second secondary windings 25, 45 to control the gating of the rectifiers 12, 14 as well as the third MOSFET device 32 provides certain advantages. First, the turns ratios of the first and second secondary windings 24, 25 can be selected to enable a wide range of output voltage $V_{OUT}$ scalability without effecting the gating characteristics of the first and second rectifiers 12, 14 and the third MOSFET device 32. Second, the second secondary winding 25 provides isolation from the first secondary winding 24, which allows parallel connection of the output terminals with other DC-to-DC power converters without having to use isolation diodes to protect the sychronous rectifiers 12,14.

Having thus described a preferred embodiment of a self-driven synchronous rectification circuit for use with non-optimal reset drive voltage, it should be apparent to those skilled in the art that certain advantages of the foregoing system have been achieved. It should also be appreciated that various modifications, adaptations, and alternative embodiments thereof may be made within the scope and spirit of the present invention. The invention is further defined by the following claims.

What is claimed is:

1. A power converter circuit, comprising:
    a transformer having a primary winding and a secondary winding, said secondary winding having a first end and a second end, said primary winding being supplied with a periodic voltage waveform that remains at a zero voltage level for a portion of a power cycle thereof;
    a first synchronous rectifier connected in series with said first end of said secondary winding and controlled by a voltage at said second end of said secondary winding;
    a second synchronous rectifier connected in series with said second end of said secondary winding, said second synchronous rectifier being further connected to an output terminal of said power converter circuit through a storage choke;
    a saturable reactor connected in series between said first synchronous rectifier and said first end of said secondary winding;
    a switching device connected to said first end of said secondary winding and controlled by said voltage at said second end of said secondary winding, said switching device further controlling said second synchronous rectifier; and
    a capacitor connected to said second synchronous rectifier, said capacitor being charged by operation of said switching device to maintain said second synchronous rectifier in a conductive state during said zero voltage level portion of said periodic voltage waveform, wherein upon transition to a positive voltage level portion of said periodic voltage waveform following said zero voltage level portion, said capacitor discharges through said switching device, and said saturable reactor precludes current from flowing through said first synchronous rectifier for a period of time sufficient to allow said capacitor to discharge.

2. The power converter circuit of claim 1, wherein said periodic waveform further comprises a non-optimal reset waveform.

3. The power converter circuit of claim 1, wherein said first synchronous rectifier further comprises a first MOSFET having a drain terminal connected to said first end of said secondary winding, a gate terminal connected to said second end of said secondary winding, and a source terminal connected to ground.

4. The power converter circuit of claim 3, wherein said saturable reactor is connected in series between said drain terminal of said first MOSFET and said first end of said secondary winding.

5. The power converter circuit of claim 3, wherein said second synchronous rectifier further comprises a second MOSFET having a drain terminal connected to said second end of said secondary winding, a gate terminal, and a source terminal connected to ground, said drain terminal of said second MOSFET being further connected to said output terminal of said power converter circuit through said storage choke.

6. The power converter circuit of claim 5, wherein said switching device further comprises a third MOSFET having a drain terminal connected to said gate terminal of said second MOSFET, a source terminal connected to said first end of said secondary winding, and a gate terminal connected to said second end of said secondary winding.

7. The power converter circuit of claim 6, wherein said capacitor is connected between said gate terminal of said second MOSFET and ground.

8. The power converter circuit of claim 7, wherein said capacitor is charged by current flowing through a body diode of said third MOSFET in order to maintain said second MOSFET in said conductive state during said zero voltage level portion of said periodic voltage waveform.

9. The power converter circuit of claim 1, wherein said first and second synchronous rectifiers further comprise n-channel enhancement-type MOSFETs.

10. The power converter circuit of claim 1, wherein said switching device further comprises an n-channel enhancement-type MOSFET.

11. The power converter circuit of claim 1, wherein said secondary winding further comprises a first secondary winding and a second secondary winding each having respective first and second ends.

12. The power converter circuit of claim 11, wherein said first and second secondary windings have opposite polarity.

13. The power converter circuit of claim 11, wherein said first synchronous rectifier further comprises a first MOSFET having a drain terminal connected to said first end of said first secondary winding, a gate terminal connected to said first end of said second secondary winding, and a source terminal connected to ground.

14. The power converter circuit of claim 13, wherein said second synchronous rectifier further comprises a second MOSFET having a drain terminal connected to said second end of said first secondary winding, a gate terminal, and a source terminal connected to ground, said drain terminal of said second MOSFET being further connected to said output terminal of said power converter circuit through said storage choke.

15. The power converter circuit of claim 14, wherein said switching device further comprises a third MOSFET having a drain terminal connected to said gate terminal of said second MOSFET, a source terminal connected to said second end of said second secondary winding, and a gate terminal connected to said first end of said second secondary winding.

16. The power converter circuit of claim 11, further comprising a flip-flop circuit coupled to said first and second ends of said second secondary winding, said flip-flop circuit alternatively coupling one of said first and second ends of said second secondary winding to ground.

17. The power converter circuit of claim 11, wherein said second secondary winding further comprises a center tap connected to ground.

18. The power converter circuit of claim 17, wherein said second synchronous rectifier further comprises a second MOSFET having a drain terminal connected to said second end of said first secondary winding, a gate terminal, and a source terminal connected to ground, said drain terminal of said second MOSFET being further connected to said output terminal of said power converter circuit through said storage choke.

19. The power converter circuit of claim 18, wherein said switching device further comprises a third MOSFET having a drain terminal connected to said gate terminal of said second MOSFET, a source terminal connected to said second end of said second secondary winding, and a gate terminal connected to ground.

\* \* \* \* \*